US008675146B2

(12) United States Patent
Kuroki

(10) Patent No.: US 8,675,146 B2
(45) Date of Patent: Mar. 18, 2014

(54) DISPLAY STRUCTURE HAVING A TRANSMITTANCE-CONTROLLABLE LAYER

(75) Inventor: Shunichiro Kuroki, Tokyo (JP)

(73) Assignee: Empire Technology Development LLC, Wilmington, DE (US)

( * ) Notice: Subject to any disclaimer, the term of this patent is extended or adjusted under 35 U.S.C. 154(b) by 44 days.

(21) Appl. No.: 13/583,779

(22) PCT Filed: Jun. 12, 2012

(86) PCT No.: PCT/JP2012/003820
§ 371 (c)(1),
(2), (4) Date: Sep. 10, 2012

(87) PCT Pub. No.: WO2013/186808
PCT Pub. Date: Dec. 19, 2013

(65) Prior Publication Data
US 2013/0328780 A1 Dec. 12, 2013

(51) Int. Cl.
G02F 1/1335 (2006.01)
G03B 21/14 (2006.01)
G02B 27/10 (2006.01)

(52) U.S. Cl.
USPC ....... 349/5; 349/9; 349/112; 353/20; 359/619

(58) Field of Classification Search
USPC .............. 349/5, 9, 112; 359/485, 619; 353/20
See application file for complete search history.

(56) References Cited

U.S. PATENT DOCUMENTS

| 6,437,900 | B1 | 8/2002 | Cornelissen et al. |
| 2003/0043315 | A1 | 3/2003 | Umemoto et al. |
| 2003/0072080 | A1* | 4/2003 | Ariyoshi et al. ............... 359/487 |
| 2010/0188726 | A1 | 7/2010 | Yoshimura et al. |
| 2010/0296025 | A1 | 11/2010 | Gourlay |
| 2011/0217629 | A1* | 9/2011 | Okuyama et al. ................. 430/4 |

FOREIGN PATENT DOCUMENTS

| JP | 6-167689 A | 6/1994 |
| JP | 2002-542413 A | 12/2002 |
| JP | 2002-542513 | 12/2002 |
| JP | 2003-66445 A | 3/2003 |
| JP | 2011-504641 A | 2/2011 |

OTHER PUBLICATIONS

"Dimming mirror device to achieve a significant reduction of the environmental impact of living", available at http://www.iblc.co.jp/nedo/category04/14.html, downloaded on Aug. 31, 2012.
"Video: look over there lucidity, EL organic notebook Samsung", available at http://japanese.engadget.com/2010/01/08/transparent/, published in 2010.

(Continued)

Primary Examiner — Amir Alavi
Assistant Examiner — Kenny Cese
(74) Attorney, Agent, or Firm — Knobbe, Martens, Olson & Bear LLP

(57) ABSTRACT

A display structure includes a liquid crystal module, and a light guide layer arranged on a surface of the liquid crystal module, first light-emitting devices arranged at an edge of one end portion of the light guide layer, and a transmittance-controllable layer arranged on a surface of the light guide layer opposing the liquid crystal module. The light-emitting devices are configured to emit light into the light guide layer, and thus the light emitted by the light-emitting devices is transmitted within the light guide layer. The transmittance-controllable layer may have light transmittance characteristics which change depending on an external stimulus applied thereto.

21 Claims, 9 Drawing Sheets

(56) References Cited

OTHER PUBLICATIONS

"It is a transparent display market to reach $ 87.2 billion in 2025", available at http://www.displaybank.com/jp2005/news/press_show.php?id=9150, published Apr. 2011.

"Liquid crystal display", available at http://en.wikipedia.org/wiki/Liquid_crystal_display, downloaded on Aug. 31, 2012.

International Search Report and Written Opinion mailed Jul. 24, 2012 in PCT/JP2012/003820.

* cited by examiner

DISPLAY STRUCTURE HAVING A TRANSMITTANCE-CONTROLLABLE LAYER

CROSS-REFERENCE TO RELATED APPLICATIONS

This application is the U.S. National Phase under 35 U.S.C. §371 of International Application No. PCT/JP2012/003820, filed Jun. 12, 2012. The contents of the International Application are hereby incorporated by reference in their entirety.

TECHNICAL FIELD

The present disclosure generally relates to display structures, and particularly to a display structure having a transmittance-controllable layer.

BACKGROUND

Liquid Crystal Displays (LCDs) are display devices that use light modulating properties of crystal liquids. As the crystal liquids do not emit light directly, the LCDs require a surface light source to evenly illuminate an entire surface of a panel or screen.

Backlighting is a well-known example of a surface light source technology. Back-lighting typically requires, in part, light-emitting diodes (LEDs) as well as a light guide panel on which a reflective layer is formed. In the course of the back-lighting, light emitted from LEDs enters into a side edge of the light guide panel. The light emitted into the light guide panel propagates throughout the light guide panel by constantly bouncing from the panel's boundary surfaces by a process of total internal reflection, while diffusing part of the propagating light, thereby allowing the light to be emitted from the front surface of the light guide panel. Thus, the entire area of the light guide panel can be illuminated by the light emitted from the LEDs.

SUMMARY

In an aspect, the present disclosure sets forth a display structure. The display structure may include a liquid crystal module, and a first light guide layer arranged on a first surface of the liquid crystal module, at least one first light-emitting device arranged at an edge of one end portion of the first light guide layer, and a first transmittance-controllable layer arranged on a surface of the first light guide layer opposing the liquid crystal module. The at least one first light-emitting device may be configured to emit light into the first light guide layer, and thus the light emitted by the at least one first light-emitting device may be transmitted within the first light guide layer. The first transmittance-controllable layer may have light transmittance characteristics which change depending on an external stimulus applied thereto. Specifically, the first transmittance-controllable layer may be configured to have a first light transmittance which allows external light to pass therethrough by a first stimulus and to have a second light transmittance which reflects the light emitted by the at least one first light-emitting device thereon by a second stimulus. As one non-limiting example, the external stimulus to be applied may be a voltage. Further, the external stimulus may be a light beam with a predetermined wavelength.

The display structure may further include a second light guide layer arranged on a second surface opposing the first surface of the liquid crystal module, at least one second light-emitting device arranged at an edge of one end portion of the second light guide layer, and a second transmittance-controllable layer arranged on a surface of the second light guide layer opposing the liquid crystal module. The second transmittance-controllable layer may be configured to have the first light transmittance which allows external light to pass therethrough by the first stimulus and to have the second light transmittance which reflects the light emitted by the at least one second light-emitting device thereon by the second stimulus.

In a further aspect, a display device may be provided. the display device may include a display structure, as discussed above, and a controller. The controller may be configured to control the light transmittance of the first transmittance-controllable layer between the first light transmittance and the second light transmittance and to control the emissions of the at least one first light-emitting device relative to the controlling of the light transmittance.

In a further aspect, an electronic device may be provided. The electronic device may include a housing, a keyboard arranged on the housing, and a display device, as discussed above. The display device is operatively connected to a side portion of the housing so as to arrange the sensing layer in an outward-facing position and configured to pivot on the side portion between a closed position where the display device covers the keyboard and an open position where the display device does not cover the keyboard.

In a further aspect, the present disclosure may set forth a method of controlling back-lighting of a display device. The method may include applying a predetermined stimulus to a first transmittance-controllable layer arranged on a first surface of a first light guide layer arranged on a surface of a liquid crystal module, and controlling the at least one first light-emitting device arranged at an edge of one end portion of the first light guide layer. The method may further include applying a predetermined stimulus to a second transmittance-controllable layer arranged on a second light guide layer arranged on a second surface opposing the first surface of the liquid crystal module, and controlling at least one second light-emitting device arranged at an edge of one end portion of the second light guide layer.

In a further aspect, a method of manufacturing a display structure may be provided. The method may include providing a liquid crystal module, arranging a first light guide layer on a first surface of the liquid crystal module, arranging at least one first light-emitting device at an edge of one end portion of the first light guide layer, and arranging a first transmittance-controllable layer on a surface of the first light guide layer opposing the liquid crystal module.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
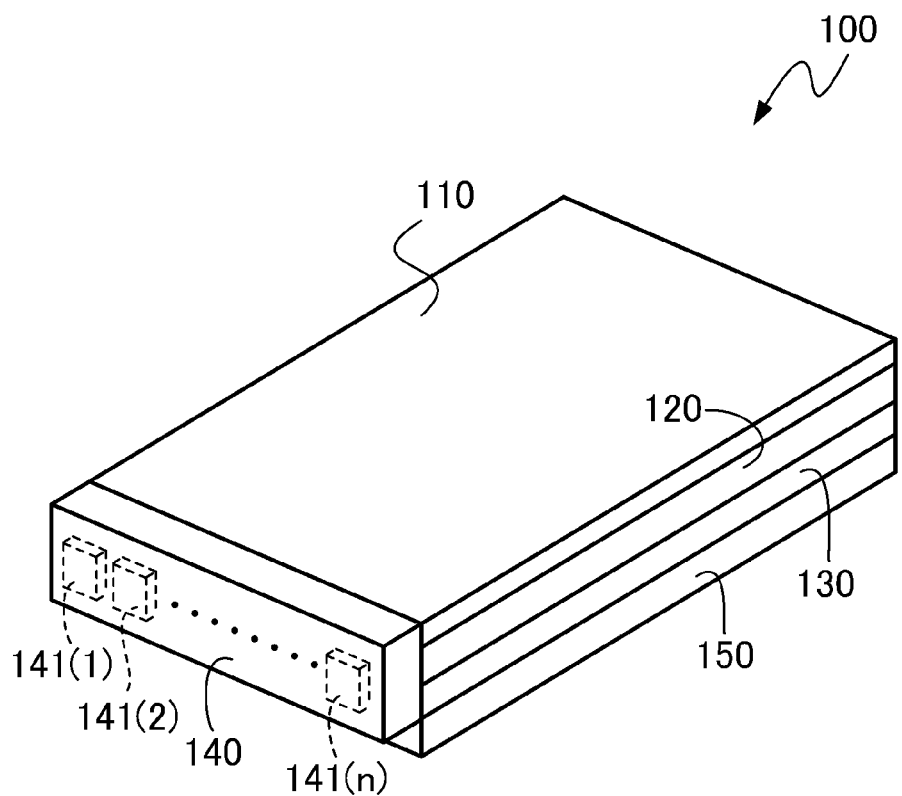
FIG. 1 is a schematic cross-sectional view showing an example of a display structure arranged in accordance with the present disclosure.

In the following detailed description, reference is made to the accompanying drawings, which form a part hereof. In the drawings, similar symbols typically identify similar components, unless context dictates otherwise. Further, the drawings are intended to be explanatory and may not be drawn to scale. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure describes techniques, structures, devices, apparatuses, systems, and methods for light illumination including, but not limited to, controlling a light transmittance of a transmittance-controllable layer, emitting light by at least one light emitting device into a light guide layer, transmitting the light within the light guide layer as part of the light on a surface thereof is diffused progressively. Further, the present disclosure describes techniques, structures, devices, apparatuses, systems, and methods for light illumination including, but not limited to, controlling a light transmittance of the transmittance-controllable layer so that the transmittance-controllable layer allows light to be reflected thereon or pass therethrough.

FIG. 1 is a schematic cross-sectional view showing an example of a display structure arranged in accordance with the present disclosure. Referring to FIG. 1, a display structure 100 may include a liquid crystal module 110, a light guide layer 120, a transmittance-controllable structure 130, which are arranged in a stack, and an illuminator board 140 positioned at one end of the light guide layer 120. Namely, the light guide layer 120, a transmittance-controllable structure 130, and the illuminator board 140 may form a backlight assembly of the display structure 100. The longitudinal length of the illuminator board 140 may accord to a large extent with the length in a width direction of these stacked components. The display structure 100 may further include a transparent substrate to support the above layers.

The liquid crystal module 110 may be configured to include a crystal liquid layer arranged between two transparent substrates, i.e., a color filter substrate and an array substrate (not shown). The crystal liquid layer may be made of crystal liquid material. The color filter substrate may include RGB color filters and common transparent electrodes formed thereon. The array substrate may be configured to include active elements such as, but not limited to, thin film transistors (TFTs) and transparent electrodes being arranged in an array of rows and columns. The liquid crystal module 110 may further include polarized filters to polarize light passing therethrough. As one non-limiting example, a conventional liquid crystal module may be used as the liquid crystal module 110.

Although the display structure 100 in this example may use the liquid crystal module 110, an organic electro-luminescence module may be applicable, instead of the liquid crystal module 110.

The light guide layer 120 may be configured to transmit or propagate light from the illuminator board 140 as part of the light on a surface thereof is diffused in a progressive manner. The light guide layer 120 may include, for example, reflective dots arranged on a surface thereof to reflect the propagating light toward the liquid crystal module 110. As one non-limiting example, the light guide layer 120 may be made of glass such as silicon dioxide, silica, fluorozirconate, or phosphate glass, or plastic such as fluorinated polymer, polymethylmethacrylate, or polycarbonate, but is not limited to being made of such glass or plastic. As one non-limiting example, the light guide layer 120 may contain fluorescent substances which may emit light responsive to the transmitted light. A non-limiting example of the thickness of the light guide layer 120 may be greater than about several micrometres and about 500 millimetres or less. The thickness of the light guide layer 120 may be determined to a large extent by the size of a display device.

The transmittance-controllable structure 130 may be configured to include a transmittance-controllable layer (see FIG. 2) having light transmittance characteristics which change depending on an external stimulus applied thereto. The transmittance-controllable structure 130 may be referred to as a chromic device. As one non-limiting example, the transmittance-controllable structure 130 may be an electrochromic device having light transmittance characteristics which change depending on a voltage (or current) applied thereto. As another non-limiting example, the transmittance-controllable structure 130 may be a gaschromic device having light transmittance characteristics which change depending on a gas applied thereto. Alternatively, the transmittance-controllable structure 130 may be a thermochromic device. Further, the transmittance-controllable structure 130 may be an optica The light transmittance of the transmittance-controllable structure 130 may be indicated by a range of between about 0 and 100 %. In some embodiments, a light transmittance of 0% of the transmittance-controllable structure 130 may cause a total reflection at a boundary surface of the transmittance-controllable structure 130. Further, a light transmittance of 100% of the transmittance-controllable structure 130 may cause light at an incident angle greater than a predetermined angle to fully pass therethrough. In some embodiments, however, performance of the transmittance-controllable structure 130 may not require the light transmittance of 100%. A light transmittance of about, for example, 50% or less, would be sufficient for the effective functioning of the transmittance-controllable structure 130. The transmittance-controllable structure 130 will be discussed in detail with reference to FIG. 2 later.

The illuminator board 140 may be arranged at one end of the light guide layer 120. The illuminator board 140 may include a plurality of light emitting devices 141(1)-141(n) (hereinafter, as the case may be, collectively referred to as the "plurality of light emitting devices 141"). The plurality of light emitting devices 141 may be arranged in arrays in the width direction of the light guide layer 140 in order to provide substantially planar light to the light guide layer 140. The plurality of light emitting devices 141 may be, for example, but are not limited to being, light-emitting diodes (LEDs), each of which is capable of emitting white light or pseudo-white light. The number of the light emitting devices 141 may depend on the length in the width direction of the light guide layer 120. As one non-limiting example, the number of the light emitting devices 141 may be between 1 and about 100. A specific example of the number is between about 10 and about 30. Specific, non-limiting, examples of the number of devices may include 1 device, 2 devices, 5 devices, 10 devices, 20 devices, 30 devices, 40 devices, 50 devices, 60 devices, 70 devices, 80 devices, 90 devices, 100 devices, and ranges between any two of these values. Alternatively, for a wall vision or very-large display system, the number of the light emitting devices 141 may be greater than 100. The plurality of light emitting devices 141 may be driven by a driver circuit (not shown). The illuminator board 140 may be configured by a cold-cathode tube.

Although, in this example, the light emitting devices 141 may be white light-emitting devices, a combination of, for example, red light-emitting devices, green light-emitting devices, and blue light-emitting devices may alternatively or additionally be used to produce pseudo white light.

Figure 2:
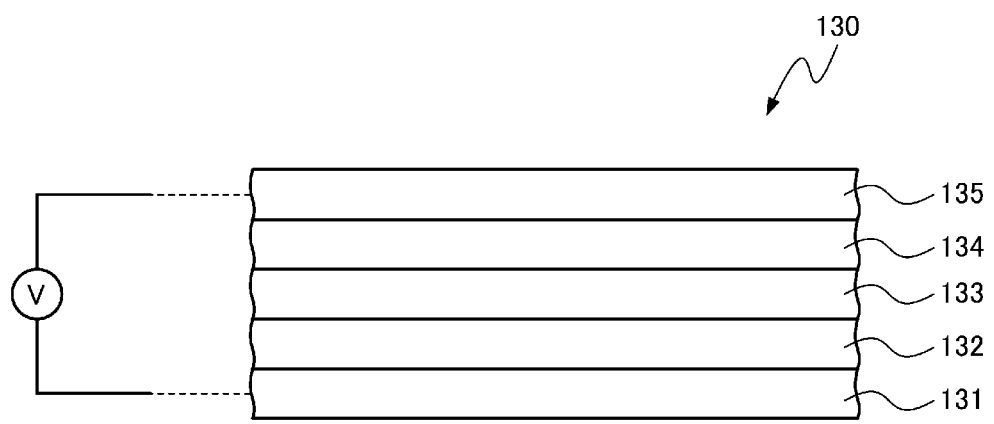
FIG. 2 is a schematic, partial cross-sectional view showing an example of a transmittance-controllable structure of a display structure arranged in accordance with the present disclosure.

FIG. 2 is a schematic, partial cross-sectional view showing an example of a transmittance-controllable structure of a display structure arranged in accordance with the present disclosure. More specifically, FIG. 2 illustrates an example of a transmittance-controllable structure, which may be an electrochromic device.

As shown in FIG. 2, the transmittance-controllable structure 130 may include, for example, but is not limited to being, a transparent conductive layer 131, an ion storage layer 132, a solid electrolyte layer 133, a catalyst layer 134, and a transmittance-controllable layer 135, which are arranged in a stack. By way of applying a predetermined voltage between the transparent conductive layer 131 and a transmittance-controllable layer 135, the light transmittance of the transmittance-controllable layer 135 may change.

The transparent conductive layer 131, being transparent, may be one of two electrode layers of the transmittance-controllable structure 130. The ion storage layer 132 may be configured to store protons, which are necessary to change the light transmittance of the transmittance-controllable layer 135. The ion storage layer 132 may be made of a transition metal oxide, such as, but not limited to being, molybdenum oxide, niobium oxide, or vanadium oxide. The solid electrolyte layer 133 may be a layer having properties whereby the protons can move freely by application of a voltage. The solid electrolyte layer 133 may be made of a transparent anhydrous metal oxide, such as, but not limited to being, tantalum oxide or zirconium oxide. The catalyst layer 134 may function so as to discharge the protons into the transmittance-controllable layer 135. The catalyst layer 134 may be made of, for example, but is not limited to being made of, palladium, platinum, silver, or an alloy thereof. The transmittance-controllable layer 135 may be a layer configured to have characteristics switchable between a transparent state and a reflective state by storing and discharging the protons and/or hydrogen. As one non-limiting example, the transmittance-controllable layer 135 may be made of a hydrogen-containing alloy. For example, the hydrogen-containing alloy may comprise at least one selected from the group consisting of magnesium, nickel, titanium and niobium.

As one non-limiting example, the transmittance-controllable structure 130 may have a first light transmittance which allows external light to pass therethrough by applying a first voltage (e.g., 1 to 5 voltage) between the transparent conductive layer 131 and the transmittance-controllable layer 134, whereas the transmittance-controllable structure 130 may have a second light transmittance which reflects the light emitted by the at least one first light-emitting device thereon by a second voltage (e.g., 1 to 5 voltage).

Although not shown in FIG. 2, the transmittance-controllable structure 130 may further include another layer, such as a buffer layer, having conductive properties. The buffer layer may facilitate a current flow, thereby enhancing a switching speed of the transmittance-controllable layer 135.

The transmittance-controllable structure 130 may be a gaschromic device having light transmittance characteristics which change depending on a gas applied thereto. The transmittance-controllable layer 135 may be exposed by a gas so as to change the light transmittance thereof.

Figure 3:
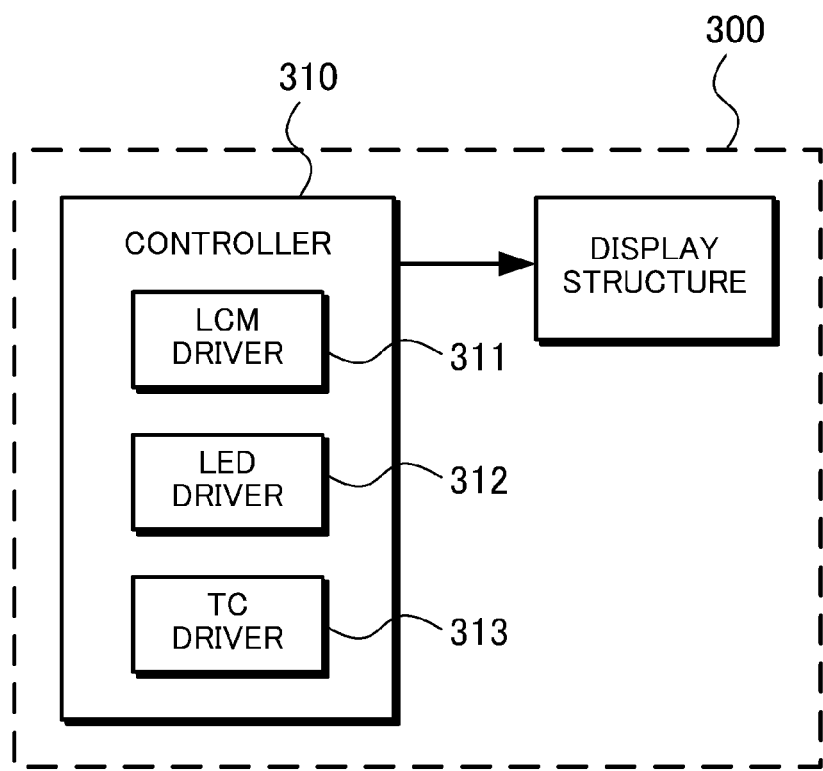
FIG. 3 is a block diagram showing an example of a display device using a display structure arranged in accordance with the present invention.

FIG. 3 is a block diagram showing an example of a display device using a display structure arranged in accordance with the present invention. Referring to FIG. 3, a display device 300 may include a display structure 100 and a controller 310 configured to control operation of the display structure 100. The controller 310 may include a liquid crystal module driver (LCM driver) 311, a light-emitting device driver (LED driver) 323, and a transmittance control driver (TC driver) 313. The controller 310 may be implemented as hardware or as software, or alternatively, firmware, that is executed on a processor. As one non-limiting example, the controller 310 may be implemented by a computing device 800 discussed with reference to FIG. 8.

The LCM driver 311 may be configured to drive the TFTs of the liquid crystal module 110 in accordance with video signals generated, in order to form images. The LED driver 323 may be configured to drive the light-emitting devices 141 of the illuminator board 140 in order to emit light into the light guide layer 120. The TC driver 313 may be configured to apply a stimulus, such as a voltage, to the transmittance-controllable structure 130 in order to change the light transmittance of the transmittance-controllable layer 135. The controller 310 may control operations of the LED driver 312 and the TC driver 313 so that the light-emitting devices 141 may emit light into the light guide layer 120 in the case where the light transmittance of the transmittance-controllable structure 130 may be controlled so as to reflect the light propagating in the light guide layer 120.

Figure 4A:
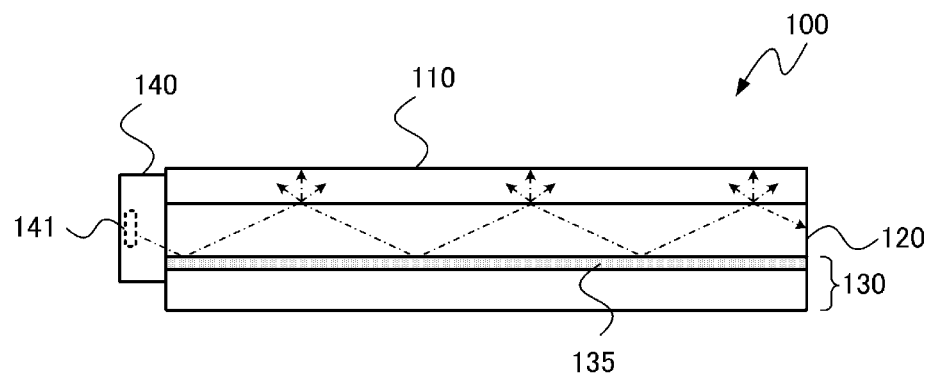
FIG. 4A is a schematic cross-sectional view showing a reflection mode of a display structure arranged in accordance with the present disclosure.
Figure 4B:
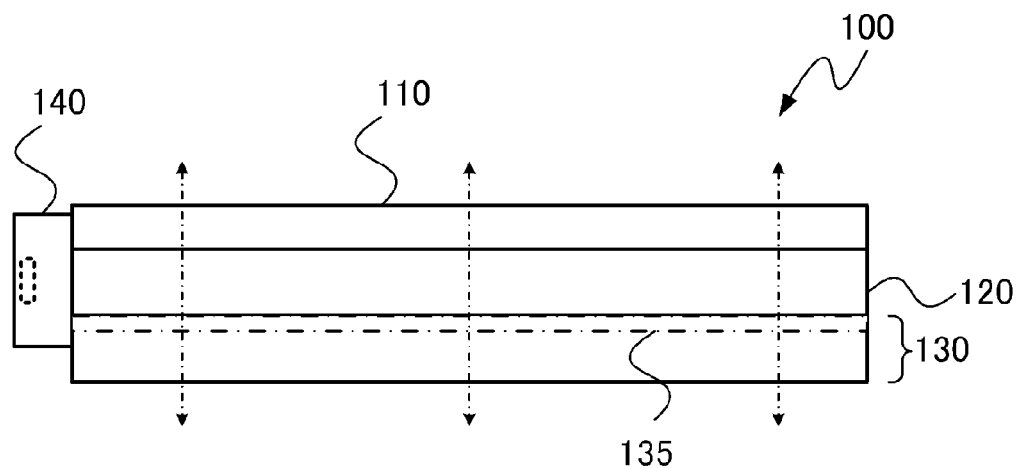
FIG. 4B is a schematic cross-sectional view showing a transparent mode of a display structure arranged in accordance with the present disclosure.

FIGS. 4A and 4B are schematic cross-sectional views showing operational modes of a display structure arranged in accordance with the present disclosure. In this example, the display structure 100 may have two operational modes, as discussed below.

Referring to FIG. 4A, the display structure 100 may be in a reflective mode. In this reflective mode, upon control of the controller 310, the liquid crystal module 110 may be driven to form images, while the illuminator board 140 may be driven to emit light into the light guide layer 120. Through this process, the propagating light within the light guide layer 120 may reflect on the transmittance-controllable layer 135, thereby achieving backlighting for the liquid crystal module 110. Thus, during the reflective mode, an observer may see images formed by the crystal module 110.

Referring next to FIG. 4B, the display structure 100 may be in a transparent mode. In this transparent mode, under control of the controller 310, the illuminator board 140 may be turned off, allowing external light to pass through the display structure 100.

Figure 5:
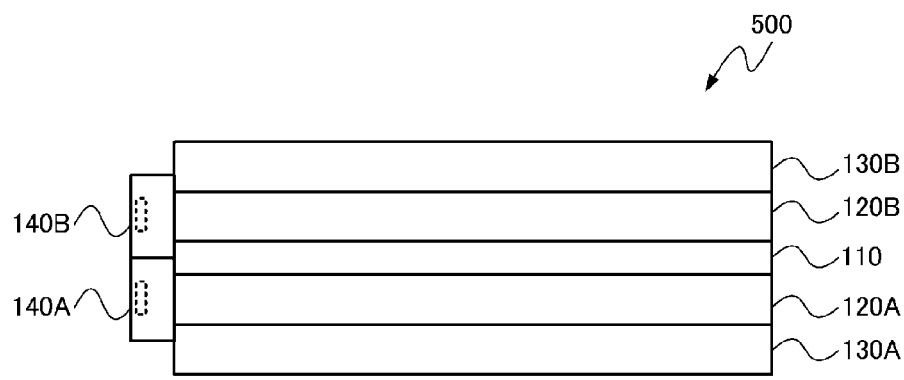
FIG. 5 is a schematic side view showing a further example of a display structure arranged in accordance with the present disclosure.

FIG. 5 is a schematic side view showing a further example of a display structure arranged in accordance with the present disclosure. As shown in FIG. 4, the display structure 500 may include a liquid crystal module 110, a first light guide layer 120A, a first transmittance-controllable structure 130A, a second light guide layer 120B, a second transmittance-controllable structure 130B, which are arranged in a stack, and illuminator boards 140A and 140B, each of which is positioned at one end of each of the first light guide layers 120A and the second light guide layers 120B. In other words, the display structure 500 may be configured so that two backlight assemblies, each having transmittance-controllable layers, are arranged at both surfaces of the liquid crystal module 110 in a symmetric fashion. Each of the light guide layers 120A and 120B may be made of the same material as each other, but alternatively, may be different from each other. Further, each of the transmittance-controllable structures 130A and 130B may be made of the same material and/or have the same configuration as each other, but alternatively, may be different from each other.

Figure 6A:
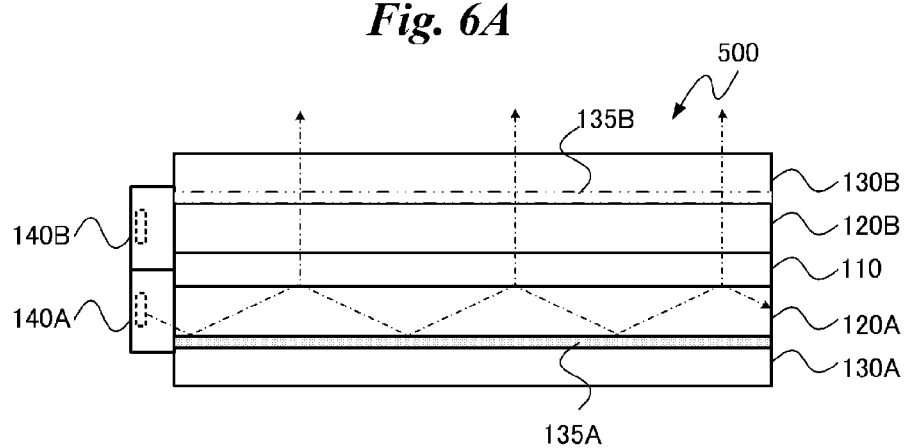
FIG. 6A is a schematic cross-sectional view showing an operational mode of a display structure arranged in accordance with the present disclosure
Figure 6B:
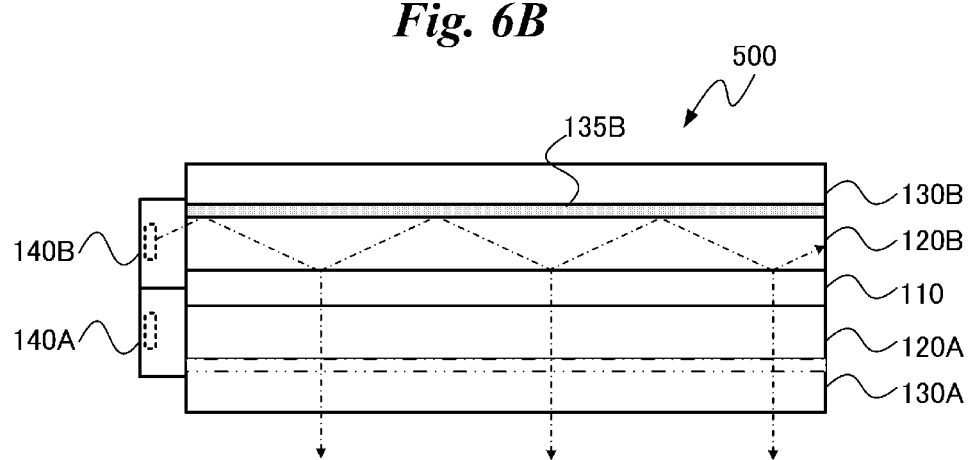
FIG. 6B is a schematic cross-sectional view showing an operational mode of a display structure arranged in accordance with the present disclosure
Figure 6C:
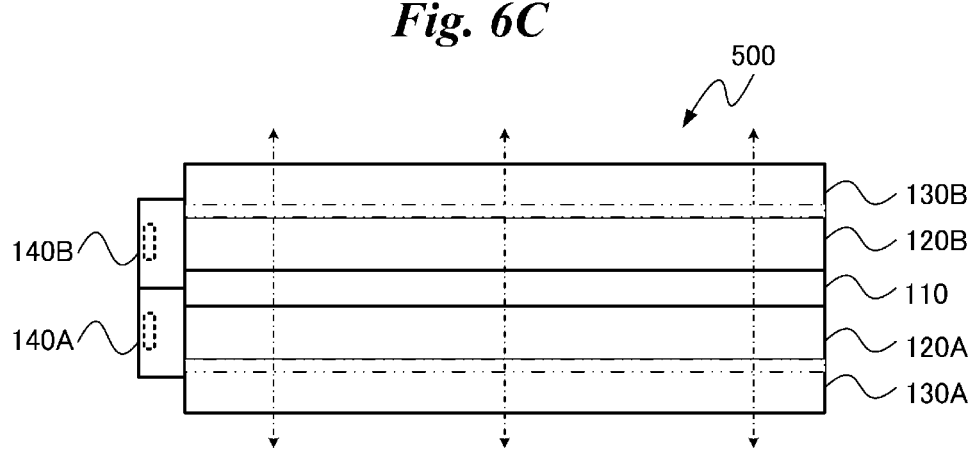
FIG. 6C is a schematic cross-sectional view showing an operational mode of a display structure arranged in accordance with the present disclosure

FIGS. 6A-6C are schematic cross-sectional views showing operational modes of a display structure arranged in accordance with the present disclosure. In this example, the display structure 500 may have three operational modes, as discussed below.

Referring to FIG. 6A, the display structure 500 may be configured in a first reflective mode. In this first reflective mode, the liquid crystal module 110 may be driven to form images, while the illuminator board 140A may be driven to emit light into the light guide layer 120A. By this, the propagating light within the light guide layer 120A may reflect onto the transmittance-controllable layer 135A. On the other hand, the transmittance-controllable layer 135B may allow light to pass therethrough. Thus, the light diffusing on the boundary surface of the light guide layer 120A with the liquid crystal module 110 may reach to, and be emitted out of, the transmittable-controllable structure 130B.

FIG. 6B shows that the display structure 500 may be configured in a second reflective mode. Namely, in contrast to the above, the transmittance-controllable structure 130A may allow light to pass therethrough, whereas the transmittance-controllable structure 130A may reflect light thereon. Thus, the light diffusing on the boundary surface of the light guide layer 120B with the liquid crystal module 110 may reach to, and be emitted out of, the transmittable-controllable structure 130A.

Referring finally to FIG. 6C, the display structure 500 may be configured in a transparent mode. In this transparent mode, the illuminator boards 120A and 120B may be turned off, allowing external light to pass through the display structure 500.

Figure 7:
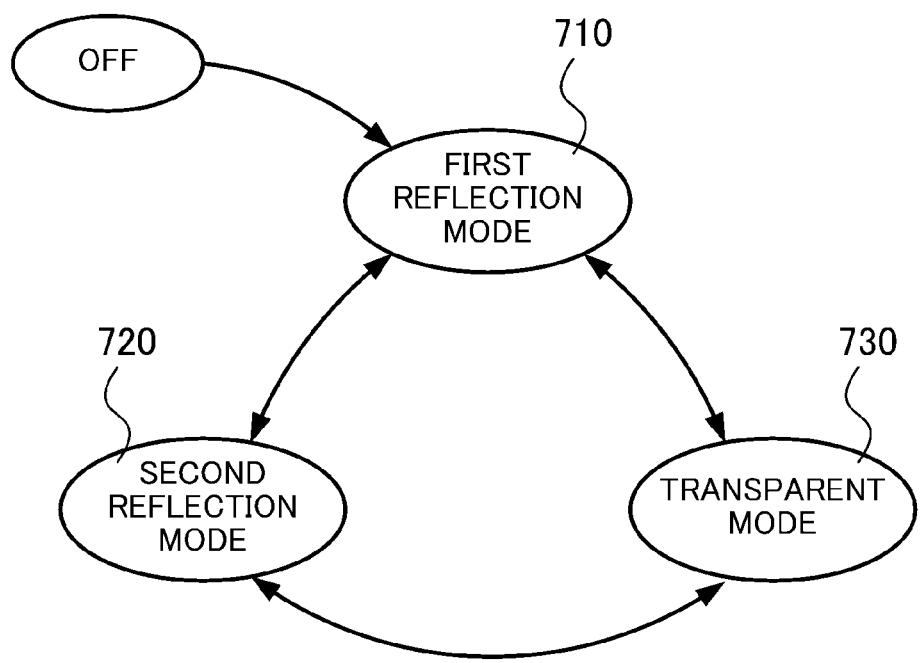
FIG. 7 is a transition diagram of operational modes in a display structure arranged in accordance with the present invention.

FIG. 7 is a transition diagram of an example of operational modes in a display structure arranged in accordance with the present invention. The foregoing operational modes in the display structure 500 may transit therebetween, as shown in FIG. 7. In this example, the display structure 500 may move to the first reflection mode 710. In transition from the first reflection mode 710 to the second reflection mode 720, the controller 310 may perform controlling so that the illumination board 140A is turned off and external light can pass through the transmittance-controllable structure 130A and the illumination board 140B is turned on and the transmittance-controllable structure 130B can reflect light emitted from the illumination board 120B. In transition from the first reflection mode 710 to the transparent mode 730, the controller 310 may perform controlling so that the illumination boards 140A and 140B are turned off and external light can pass through the transmittance-controllable structures 130A and 130B.

Figure 8:
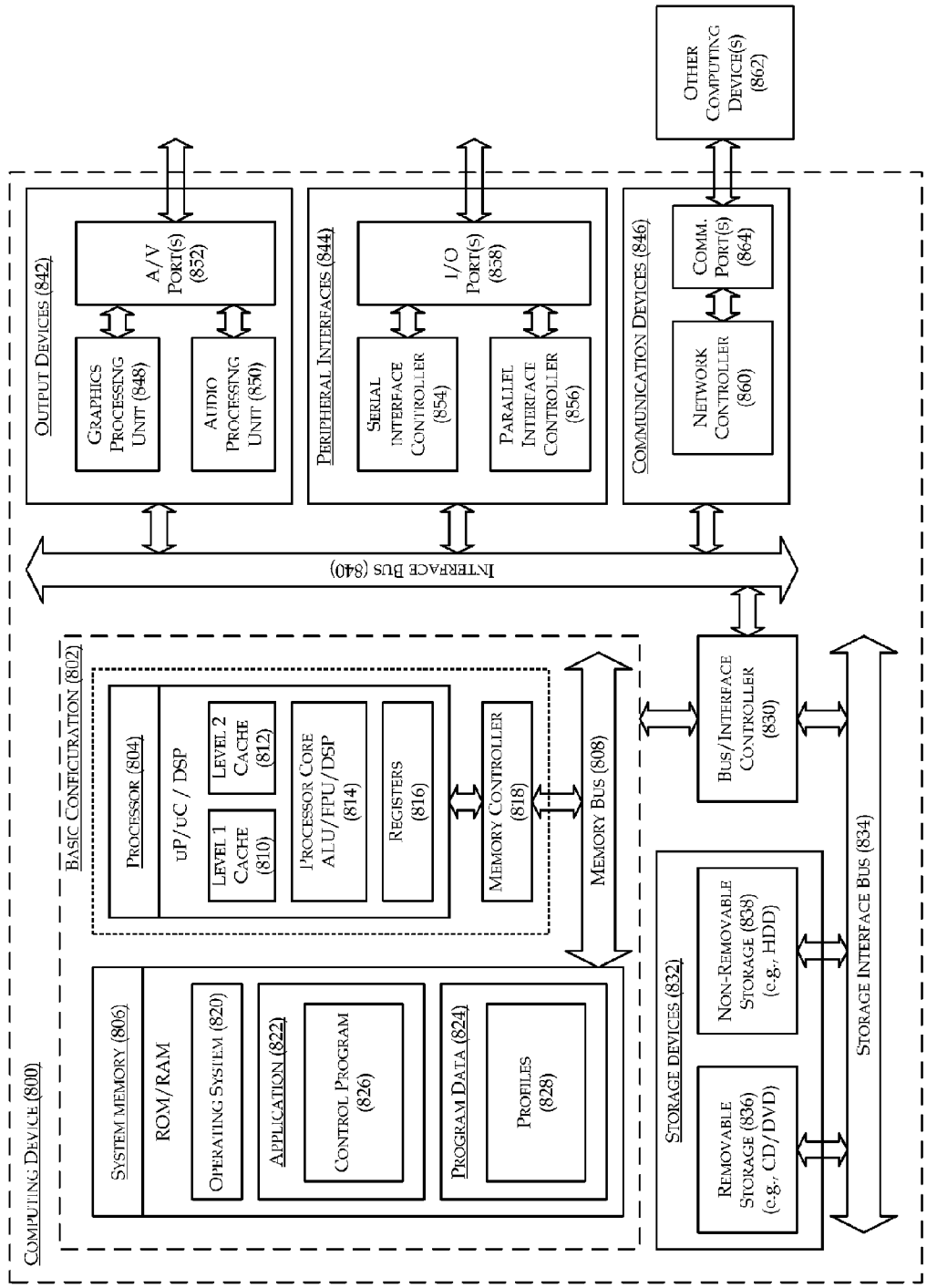
FIG. 8 is a block diagram illustrating an example of a computing device that is arranged for a display structure in accordance with the present disclosure.

FIG. 8 is a block diagram illustrating an example computing device 800 that is arranged for a display structure in accordance with the present disclosure. In a very basic configuration 802, the computing device 800 typically includes one or more processors 804 and a system memory 806. A memory bus 808 may be used for communicating between the processor 804 and the system memory 806.

Depending on the desired configuration, the processor 804 may be of any type including, but not limited to being a microprocessor, a microcontroller, a digital signal processor (DSP), or any combination thereof. The processor 804 may include one more levels of caching, such as a level one cache 810 and a level two cache 812, a processor core 814, and registers 816. A non-limiting example of the processor core 814 may include an arithmetic logic unit (ALU), a floating point unit (FPU), a digital signal processing core (DSP Core), or any combination thereof. A non-limiting example of the memory controller 818 may also be used with the processor 804, or in some implementations the memory controller 818 may be an internal part of the processor 804.

Depending on the desired configuration, the system memory 806 may be of any type, including, but not limited to being volatile memory (such as RAM), non-volatile memory (such as ROM, flash memory, etc.) or any combination thereof. The system memory 806 may include an operating system 820, one or more applications 822, and program data 824. The application 822 may include a control program 826 that is arranged to control emission of the illuminator board 140 and application of an external stimulus (e.g., a voltage) to the transmittance-controllable structure 130. The program data 824 may include profiles 828 that may be useful for controlling the display structure 130 as is described herein. In some embodiments, the application 822 may be arranged so as to operate with the program data 824 on the operating system 820 such that the implementations of light guide control may be provided as described herein. This described basic configuration 802 is illustrated in FIG. 8 by those components within the inner dashed line.

The computing device 800 may have additional features or functionality, and additional interfaces to facilitate communications between the basic configuration 802 and any required devices and interfaces. By way of non-limiting example, a bus/interface controller 830 may be used to facilitate communications between the basic configuration 802 and one or more data storage devices 832 via a storage interface bus 834. The data storage devices 832 may be removable storage devices 836, non-removable storage devices 838, or a combination thereof. Non-limiting examples of removable storage and non-removable storage devices include magnetic disk devices, such as flexible disk drives and hard-disk drives (HDD), optical disk drives such as compact disk (CD) drives or digital versatile disk (DVD) drives, solid state drives (SSD), and tape drives to name a few. Non-limiting examples of computer storage media may include volatile and nonvolatile media, removable and non-removable media, implemented in any method or technology for the storage of information, such as computer readable instructions, data structures, program modules, or other data.

The system memory 806, removable storage devices 836 and non-removable storage devices 838 are non-limiting examples of computer storage media. Computer storage media includes, but is not limited to being RAM, ROM, EEPROM, flash memory or other memory technology, CD-ROM, digital versatile disks (DVD) or other forms of optical storage, magnetic cassettes, magnetic tapes, magnetic disk storage or other magnetic storage devices, or any other medium which may be used to store the desired information and which may be accessed by the computing device 800. Any such computer storage media may be part of the computing device 800.

The computing device 800 may also include an interface bus 840 for facilitating communication from various interface devices (e.g., output devices 842, peripheral interfaces 844, and communication devices 846) to the basic configuration 802 via the bus/interface controller 830. Non-limiting examples of the output devices 842 include a graphics processing unit 848 and an audio processing unit 850, which may be configured to communicate with various external devices, such as a display or speakers, via one or more A/V ports 852. Non-limiting examples of the peripheral interfaces 844 include a serial interface controller 854 or a parallel interface controller 856, which may be configured to communicate with external devices such as input devices (e.g., keyboard, mouse, pen, voice input device, touch input device, etc.) or other peripheral devices (e.g., printer, scanner, etc.) via one or more I/O ports 858. A non-limiting example of the communication device 846 includes a network controller 860, which may be arranged to facilitate communications with one or more other computing devices 862 over a network communication link via one or more communication ports 864.

The network communication link may be one non-limiting example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media, as used herein, may include both storage media and communication media.

The computing device 800 may be implemented as a portion of a small-form factor portable (or mobile) electronic device such as a cell phone, a personal data assistant (PDA), a personal media player device, a wireless web-watch device, a personal headset device, an application specific device, or a hybrid device that includes any of the above functions. The computing device 800 may also be implemented as a personal computer including both laptop computer and non-laptop computer configurations.

Figure 9:
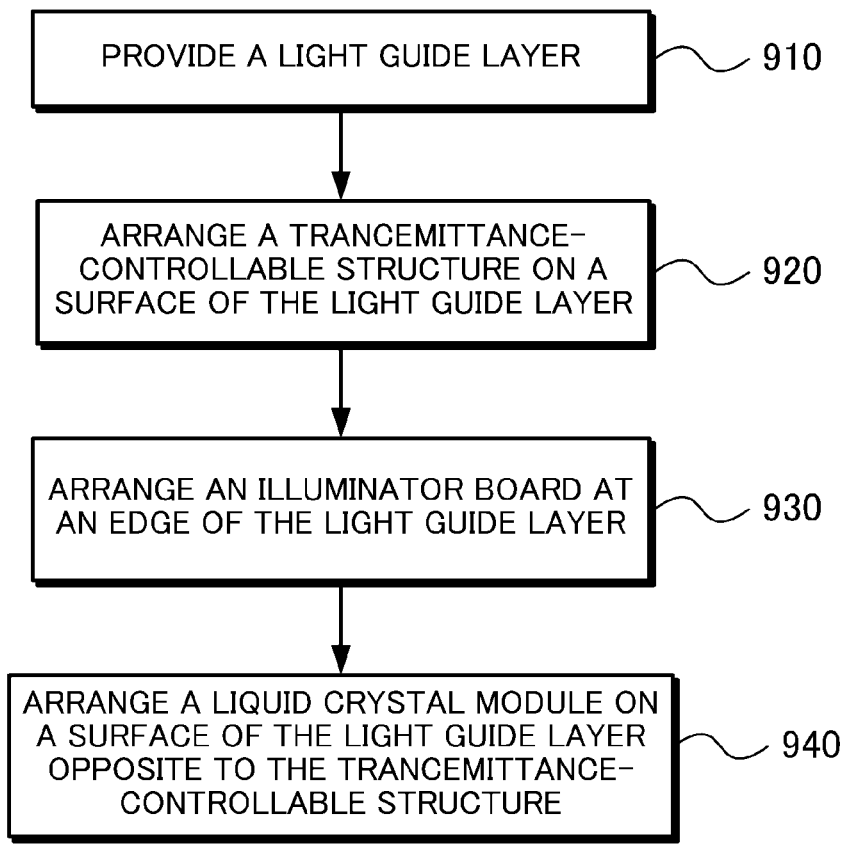
FIG. 9 is a flowchart showing a method of manufacturing a display structure arranged in accordance with the present disclosure.

FIG. 9 is a flowchart showing a method of manufacturing a display structure arranged in accordance with the present disclosure. Well-known apparatuses and processes for manufacturing liquid crystal devices may be applicable to this method.

Referring to FIG. 9, In an operation 910, a light guide layer 120 may be provided. The light guide layer 120 may be arranged on a transparent substrate. In an operation 920, a transmittance-controllable structure 130 may be arranged on a surface of the light guide layer 120. Each layer of the transmittance-controllable structure 130 may be formed by, for example, sputtering. Alternatively, chemical vapor deposition (CVD) may also be applicable. The operation 920 may include forming electrodes of the transmittance-controllable structure 130. In an operation 930, an illuminator board 140 may be arranged at an edge of one end portion of the light guide layer 120. The result thereof may be a backlight assembly. Lastly, in an operation 940, a liquid crystal module 110 may be arranged on a surface of the light guide layer 120 opposing the transmittance-controllable structure 130. Through proceeding in this manner, the display structure 100 as discussed above may be obtained.

In a case of manufacturing the display structure 500 as shown in FIG. 5, it is anticipated that two backlight assemblies may be arranged on both surfaces of the liquid crystal module 110 in a symmetrical fashion.

Figure 10:
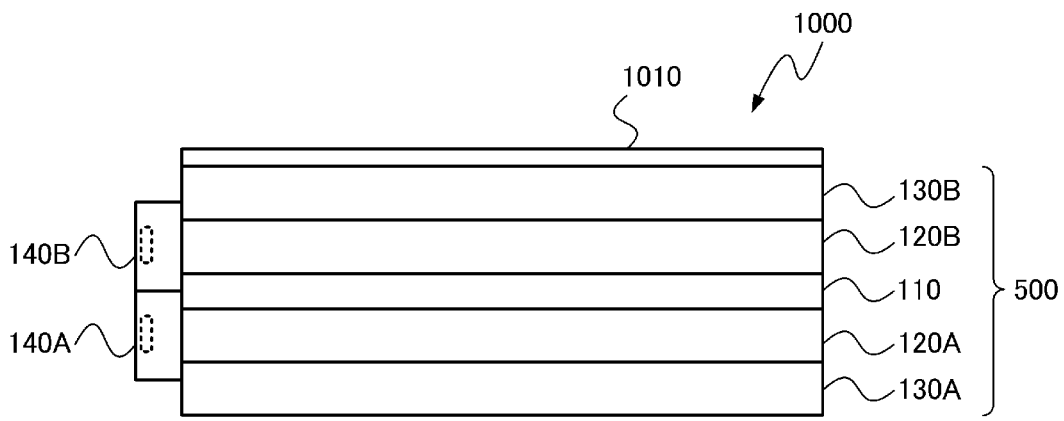
FIG. 10 is a schematic cross-sectional view of an example of a display structure arranged in accordance with the present disclosure.

FIG. 10 is a schematic cross-sectional view of an example of a display structure arranged in accordance with the present disclosure. As shown in FIG. 10, a display structure 1000 in this example may further include a sensing layer 1010 relative to the display structure 500 as shown in FIG. 5. The sensing layer 1010 may be a touch screen panel being made of a transparent material. As one non-limiting example, the controller 310 may control the sensing layer 1010 in the first reflection mode, namely: the first transmittance-controllable layer 130A is controlled so as to reflect light emitted from the first illuminator board 140A thereon, whereas the second transmittance-controllable layer 130B is controlled so as to allow the light emitted from the illuminator board 140A to pass therethrough. The sensing layer 1010 may be configured so as to output to the controller 310 a signal caused by an external event acting on a portion of the sensing layer 1010.

Figure 11A:
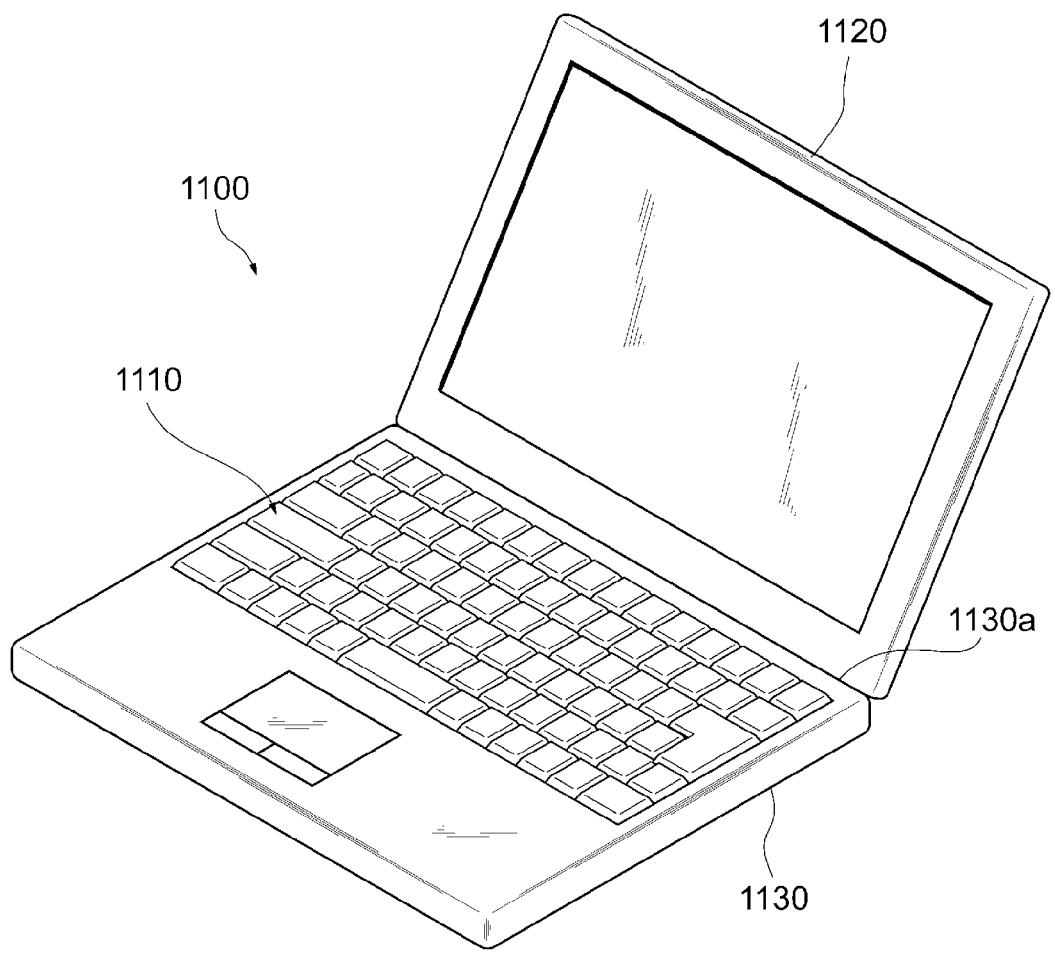
FIG. 11A is a schematic perspective view of an example of an electronic device including a display structure arranged in accordance with the present invention.
Figure 11B:
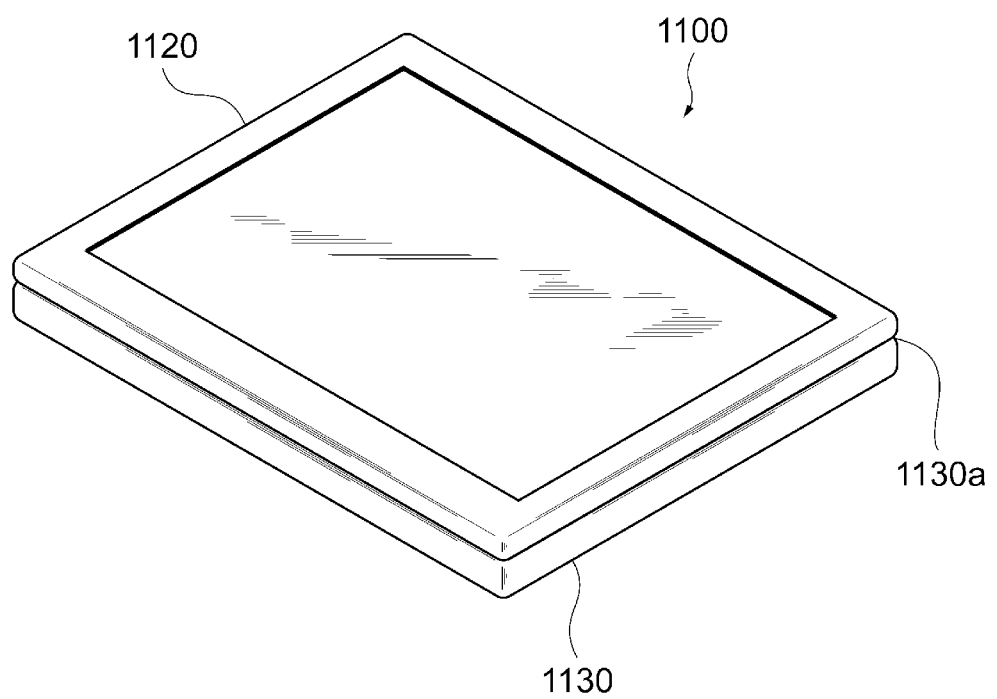
FIG. 11B is a schematic perspective view of an example of an electronic device including a display structure arranged in accordance with the present invention.
Figure 9:
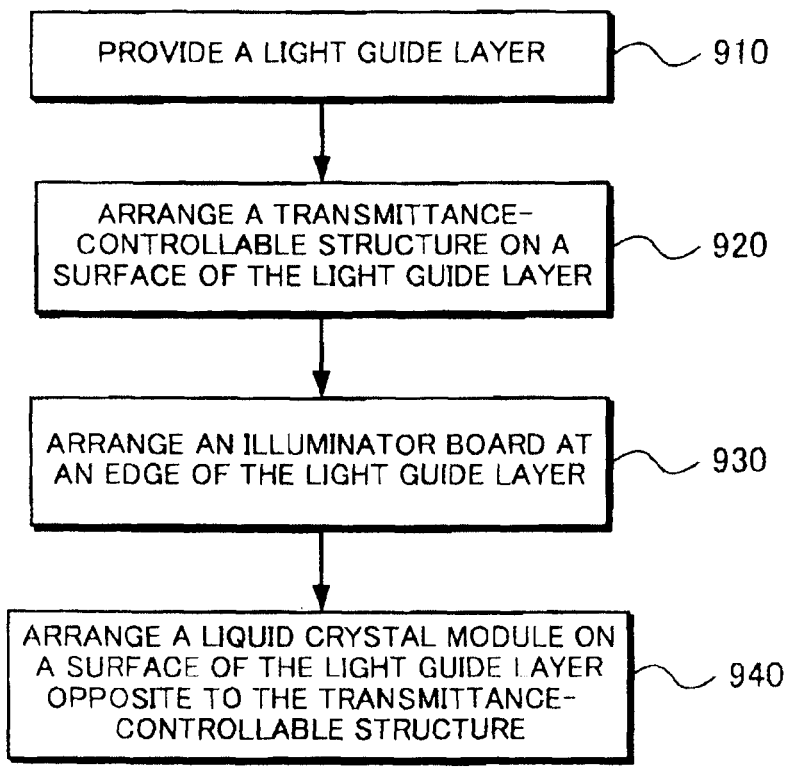
Figure 10:
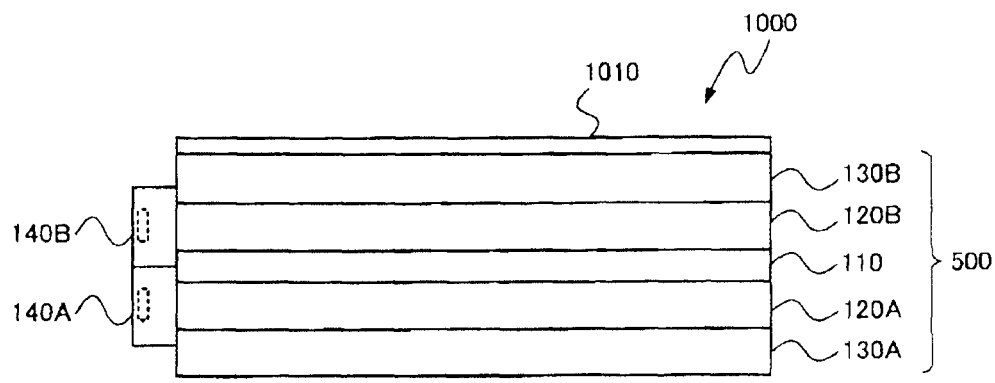

FIGS. 11A and 11B are schematic perspective views of an example of an electronic device including a display structure arranged in accordance with the present invention. In this non-limiting example, an electronic device may be a portable computer device such as a notebook computer. Specifically, as shown in FIG. 11, the electronic device 1100 may be configured to integrate typical components of a computer device, including, for example, a keyboard 1110 and a tiltable display device 1120, into a single unit. Although not shown in FIG. 11A, the electronic device 1100 may include a chip board including a processor, a storage device, and other peripheral devices in a housing 1130 thereof. The controller 310, as discussed above, may be implemented by a function of the chip board.

As one non-limiting example, the tiltable display device 1120 may be operatively connected to a horizontal side portion 1130a of the housing 1130 via a hinge and to accordingly pivot on the horizontal side portion 1130a between a closed position where the tiltable display device 1120 may cover the keyboard 1110 (see FIG. 11B) and an open position where the tiltable display device 1120 does not cover the keyboard 1110, as seen in FIG. 11A. As one non-limiting example, a sensor, such as a contact switch, may be arranged at a portion of the hinge of the housing 1130 to detect a tilt angle of the tiltable display device 1120.

Further, the tiltable display device 1120 may be configured to include the display structure 1000 as shown in FIG. 10 so as to arrange the sensing layer 1010 in an outward-facing position. In other words, the sensing layer 1010 (i.e., the touch screen panel) of the tiltable display device 1120 may form an external surface of the electronic device 1100 in the closed position, as shown in FIG. 11B. As is apparent from FIGS. 11A and 11B, a user may use the keyboard 1110, seeing one screen of the tiltable display device 1120, or alternatively the user may use the other screen of the tiltable display device 1120 as the touch screen.

More specifically, in this non-limiting example, the controller 310 may detect the tilt angle of the tiltable display device 1120 to determine whether the tiltable display device 1120 is in the closed position or in the open position. When determining that the tiltable display device 1120 is in the closed position, the controller 310 may control the operation of the tiltable display device 1120 so that the sensing layer 1010 can be used. At such time, the display structure 1000 may operate in the first reflection mode. Accordingly, the tiltable display device 1120 may function as the touch screen of the electronic device 1100. In contrast to this, when determining that the tiltable display device 1120 is in the open position, the controller 310 may control the operation of the tiltable display device 1120 so that the sensing layer 1010 cannot be used. At this time, the display structure 1000 may operate in the second reflection mode. Accordingly, the tiltable display device 1120 may function as a conventional screen for the electronic device 1100.

The tiltable display device 1120 may be configured by using a conventional liquid crystal module as the liquid crystal module 110. Thus, the LCM driver 311 may easily be designed. Further, a simple linking structure, such as a one-axis hinge, can be used to link the tiltable display device 1120 and the housing 1130 because the two screens are provided on both surfaces of the tiltable display device 1120. Accordingly, a complex linking structure, such as a two-axis hinge used in a convertible tablet computer, is not necessary.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

While the present disclosure has been described with respect to a limited number of embodiments, those skilled in the art, having benefit of this disclosure, will appreciate that other embodiments can be devised which do not depart from the scope of the present disclosure as disclosed herein. Accordingly, the scope of the present disclosure should be limited only by the attached claims.

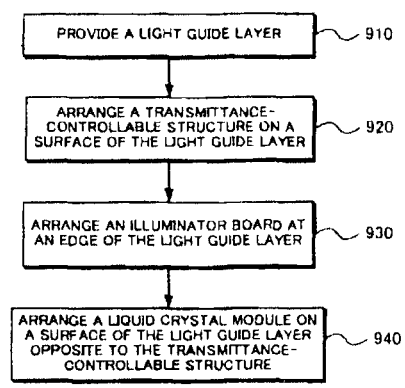

The invention claimed is:

1. A display structure comprising:
   a liquid crystal module;
   a first light guide layer arranged on a first surface of the liquid crystal module and configured to transmit light therein;
   at least one first light-emitting device arranged at an edge of one end portion of the first light guide layer and configured to emit light into the first light guide layer; and
   a first transmittance-controllable layer arranged on a surface of the first light guide layer opposing the liquid crystal module, the first transmittance-controllable layer having light transmittance characteristics which change depending on an external stimulus applied thereto;
   a second light guide layer arranged on a second surface opposing the first surface of the liquid crystal module;
   at least one second light-emitting device arranged at an edge of one end portion of the second light guide layer and configured to emit light into the second light guide layer; and
   a second transmittance-controllable layer arranged on a surface of the second light guide layer opposing the liquid crystal module,
   wherein the first transmittance-controllable layer is configured to have a first light transmittance which allows external light to pass therethrough by a first stimulus and to have a second light transmittance which reflects the light emitted by the at least one first light-emitting device thereon by a second stimulus,
   and wherein the second transmittance-controllable layer is further configured to have the first light transmittance which allows external light to pass therethrough by the first stimulus and to have the second light transmittance which reflects the light emitted by the at least one second light-emitting device thereon by the second stimulus.

2. The display structure of claim 1, wherein the at least one second light-emitting device is configured to emit the light when the second transmittance-controllable layer is controlled to have the second light transmittance.

3. The display structure of claim 2, wherein the first transmittance-controllable layer is controlled to have the first light transmittance when the second transmittance-controllable layer is controlled to have the second light transmittance and the first transmittance-controllable layer is controlled to have the second light transmittance when the second transmittance-controllable layer is controlled to have the first light transmittance.

4. The display structure of claim 2, wherein the first transmittance-controllable layer and the second transmittance-controllable layer are controlled to have the first light transmittance.

5. The display structure of claim 1, wherein the external stimulus is a gas.

6. The display structure of claim 1, wherein the at least one second light-emitting device is a light-emitting diode configured to emit visible light.

7. The display structure of claim 1, wherein the at least one second light-emitting device is a cold cathode fluorescent lamp configured to emit visible light.

8. The display structure of claim 1, wherein the first transmittance-controllable layer comprises a hydrogen-containing alloy, and the second transmittance-controllable layer comprises a hydrogen-containing alloy.

9. The display structure of claim 8, wherein the hydrogen-containing alloy comprises at least one selected from the group consisting of Mg, Ni, Ti, and Nb.

10. A display device comprising:
    a liquid crystal module;
    a first light guide layer arranged on a first surface of the liquid crystal module and configured to transmit light therein;
    at least one first light-emitting device arranged at an edge of one end portion of the first light guide layer and configured to emit light into the first light guide layer;
    a first transmittance-controllable layer arranged on a surface of the first light guide layer opposing the liquid crystal module, the first transmittance-controllable layer having light transmittance characteristics which change depending on an external stimulus applied thereto, wherein the first transmittance-controllable layer is configured to have a first light transmittance which allows external light to pass therethrough by a first stimulus and to have a second light transmittance which reflects the light emitted by the at least one first light-emitting device thereon by a second stimulus;

a second light guide layer arranged on a second surface opposing the first surface of the liquid crystal module;

at least one second light-emitting device arranged at an edge of one end portion of the second light guide layer and configured to emit into the second light guide layer; and a second transmittance-controllable layer arranged on a surface of the second light guide layer opposing the liquid crystal module, wherein the second transmittance-controllable layer is configured to have the first light transmittance which allows external light to pass therethrough by the first stimulus and to have the second light transmittance which reflects the light emitted by the at least one second light-emitting device thereon by the second stimulus, a controller configured to control the light transmittance of the first transmittance-controllable layer between the first light transmittance and the second light transmittance and to control the emission of the at least one first light-emitting device relative to the control of the light transmittance, wherein the controller is further configured to control the at least one first light-emitting device to emit the light when controlling the first transmittance-controllable layer to have the second light transmittance, and wherein the controller is further configured to control the light transmittance of the second transmittance-controllable layer between the first light transmittance and the second light transmittance and to control the emission of the at least one second light-emitting device relative to the control of the light transmittance of the second transmittance-controllable layer.

11. The display device of claim 10, wherein the controller is configured to control the first transmittance-controllable layer to have the first light transmittance when controlling the second transmittance-controllable layer to have the second light transmittance and to control the first transmittance-controllable layer to have the second light transmittance when controlling the second transmittance-controllable layer to have the first light transmittance.

12. The display device of claim 10, further comprising a sensing layer arranged on a surface of the first transmittance-controllable layer opposing the first light guide layer and configured to output a signal to the controller in accordance with an external event acting on a portion of the sensing layer, wherein the controller is configured to compute a position on the sensing layer at which the external event occurs.

13. The display device of claim 12, wherein the sensing layer is made of a transparent material.

14. The display device of claim 13, wherein the sensing layer is a touch sensor panel.

15. The display structure of claim 10 wherein the external stimulus is a gas.

16. An electronic device comprising:
a housing;
a keyboard arranged on the housing; and
a display device including a liquid crystal module and a sensing layer arranged at a first surface of the liquid crystal module, the sensing layer being configured to output a signal to a controller in accordance with an external event acting on a portion thereof, wherein the display device is operatively connected to a side portion of the housing so as to arrange the sensing layer in an outward-facing position and configured to pivot on the side portion between a closed position where the display device covers the keyboard and an open position where the display device does not cover the keyboard, wherein the display device further includes:
a first light guide layer arranged on the first surface of the liquid crystal module and configured to transmit light therein;

at least one first light-emitting device arranged at an edge of one end portion of the first light guide layer and configured to emit light into the first light guide layer;

a first transmittance-controllable layer arranged between the first light guide layer and the liquid crystal module, the first transmittance-controllable layer having light transmittance characteristics which change depending on an external stimulus applied thereto, wherein the first transmittance-controllable layer is configured to have a first light transmittance which allows external light to pass therethrough by a first stimulus and to have a second light transmittance which reflects the light emitted by the at least one first light-emitting device thereon by a second stimulus;

a second light guide layer arranged on a second surface opposing the first surface of the liquid crystal module;

at least one second light-emitting device arranged at an edge of one end portion of the second light guide layer and configured to emit light into the second light guide layer; and a second transmittance-controllable layer arranged on a surface of the second light guide layer opposing the liquid crystal module, wherein the second transmittance-controllable layer is configured to have the first light transmittance which allow external light to pass therethrough by the first stimulus and to have the second light transmittance which reflects the light emitted by the at least one second light-emitting device thereon by the second stimulus.

17. The electronic device of claim 16, wherein the controller is accommodated in the housing, wherein the controller is configured to control, when the display device is positioned at the closed position, the first transmittance-controllable layer to have the first light transmittance and the second transmittance-controllable layer to have the second light transmittance.

18. The electronic device of claim 17, wherein the controller is configured to control, when the display device is positioned at the open position, the first transmittance-controllable layer to have the second light transmittance and the second transmittance-controllable layer to have the first light transmittance.

19. A method of controlling backlighting of a display device, the method comprising:
applying a predetermined stimulus to a first transmittance-controllable layer arranged on a first surface of a first light guide layer arranged on a surface of a liquid crystal module, the first transmittance-controllable layer having light transmittance characteristics which change depending on an external stimulus applied thereto, wherein the first transmittance-controllable layer is configured to have a first light transmittance which allows external light to pass therethrough by a first stimulus and to have a second light transmittance which reflects light emitted by at least one first light-emitting device thereon by a second stimulus,
- wherein the application includes applying a predetermined stimulus to a second transmittance-controllable layer arranged on a second light guide layer arranged on a second surface opposing the first surface of the liquid crystal module; the second transmittance-controllable layer having light transmittance characteristics which change depending on an external stimulus applied thereto, wherein the second transmittance-controllable layer is configured to have the first light transmittance which allows external light to pass therethrough by the first stimulus and to have the second light transmittance which reflects the light emitted by the at least one first light-emitting device thereon by the second stimulus; and
- controlling the at least one first light-emitting device arranged at an edge of one end portion of the first light guide layer,
  - wherein, in the controlling, the at least one first light-emitting device is turned on so as to emit light into the first light guide when the second stimulus is applied to the first transmittance-controllable layer,
  - wherein, in the controlling the at least one first light-emitting device is turned off so as not to emit the light into the first light guide 1ayer when the first stimulus is applied to the first transmittance-controllable layer,
  - and wherein the controlling includes controlling at least one second light-emitting device arranged at an edge of one end portion of the second light wide layer.

20. The method of claim 19, wherein, in the controlling, the at least one second light-emitting device is turned on so as to emit the light when the second stimulus is applied to the second transmittance-controllable layer.

21. A method of manufacturing a display structure, the method comprising:
- providing a liquid crystal module;
- arranging a first light guide layer on a first surface of the liquid crystal module, wherein the first light guide layer is configured to transmit light therein;
- arranging at least one first light-emitting device at an edge of one end portion of the first light guide layer, wherein the at least one first light-emitting device is configured to emit light into the first light guide layer;
- arranging a first transmittance-controllable layer on a surface of the first light guide layer opposing the liquid crystal module, the first transmittance-controllable layer having light transmittance characteristics which change depending on an external stimulus applied thereto, wherein the first transmittance-controllable layer is configured to have a first light transmittance which allows external light to pass therethrough by a first stimulus and to have a second light transmittance which reflects the light emitted by the at least one first light-emitting device thereon by a second stimulus;
- arranging a second light guide layer on a second surface opposing the first surface of the liquid crystal module;
- arranging at least one second light-emitting device at an edge of one end portion of the second light wide layer and configured to emit light into the second light guide layer; and
- arranging a second transmittance-controllable layer on a surface of the second light guide layer opposing the liquid crystal module wherein the second transmittance-controllable layer is configured to have the first light transmittance which allows external light to pass therethrough by the first stimulus and to have the second light transmittance which reflects the light emitted by the at least one second light-emitting device thereon by the second stimulus.

* * * * *

UNITED STATES PATENT AND TRADEMARK OFFICE
CERTIFICATE OF CORRECTION

| | |
|---|---|
| PATENT NO. | : 8,675,146 B2 |
| APPLICATION NO. | : 13/583779 |
| DATED | : March 18, 2014 |
| INVENTOR(S) | : Kuroki |

It is certified that error appears in the above-identified patent and that said Letters Patent is hereby corrected as shown below:

The title page showing the illustrative figure should be deleted to be replaced with the attached title page.

In the Drawings:

Drawing sheet, consisting of Fig. 9, should be deleted to be replaced with the drawing sheet, consisting of Fig. 9, as shown on the attached page.

In the Specification:

In Column 2, Line 9, delete "provided." and insert -- provided, --, therefor.

In Column 3, Line 12, delete "disclosure" and insert -- disclosure. --, therefor.

In Column 3, Line 15, delete "disclosure" and insert -- disclosure. --, therefor.

In Column 3, Line 18, delete "disclosure" and insert -- disclosure. --, therefor.

In Column 5, Line 23, delete "light guide layer 140" and insert -- light guide layer 120 --, therefor.

In Column 5, Line 24, delete "light guide layer 140." and insert -- light guide layer 120. --, therefor.

In Column 6, Line 25, delete "transmittance-controllable layer 134," and insert -- transmittance-controllable layer 135, --, therefor.

In Column 10, Line 9, delete "In an" and insert -- in an --, therefor.

Signed and Sealed this
Seventh Day of October, 2014

Michelle K. Lee
*Deputy Director of the United States Patent and Trademark Office*

CERTIFICATE OF CORRECTION (continued)
U.S. Pat. No. 8,675,146 B2

In the Claims:

In Column 11, Lines 66-67, in Claim 1, delete "layer; and" and insert -- layer; --, therefor.

In Column 13, Line 14, in Claim 10, delete "emit" and insert -- emit light --, therefor.

In Column 13, Line 61, in Claim 15, delete "claim 10" and insert -- claim 10, --, therefor.

In Column 15, Line 25, in Claim 19, delete "guide when" and insert -- guide layer when --, therefor.

In Column 15, Line 27, in Claim 19, delete "controlling" and insert -- controlling, --, therefor.

In Column 15, Line 29, in Claim 19, delete "1ayer" and insert -- layer --, therefor.

In Column 15, Line 33, in Claim 19, delete "wide" and insert -- guide --, therefor.

In Column 16, Line 24, in Claim 21, after "portion of the second light", delete "wide" and insert -- guide --, therefor.

In Column 16, Line 29, in Claim 21, delete "module" and insert -- module, --, therefor.

(12) United States Patent
Kuroki

(10) Patent No.: US 8,675,146 B2
(45) Date of Patent: Mar. 18, 2014

(54) DISPLAY STRUCTURE HAVING A TRANSMITTANCE-CONTROLLABLE LAYER

(75) Inventor: Shunichiro Kuroki, Tokyo (JP)

(73) Assignee: Empire Technology Development LLC, Wilmington, DE (US)

(*) Notice: Subject to any disclaimer, the term of this patent is extended or adjusted under 35 U.S.C. 154(b) by 44 days.

(21) Appl. No.: 13/583,779

(22) PCT Filed: Jun. 12, 2012

(86) PCT No.: PCT/JP2012/003820
§ 371 (c)(1),
(2), (4) Date: Sep. 10, 2012

(87) PCT Pub. No.: WO2013/186808
PCT Pub. Date: Dec. 19, 2013

(65) Prior Publication Data
US 2013/0328780 A1 Dec. 12, 2013

(51) Int. Cl.
G02F 1/1335 (2006.01)
G03B 21/14 (2006.01)
G02B 27/10 (2006.01)

(52) U.S. Cl.
USPC ........ 349/5; 349/9; 349/112; 353/20; 359/619

(58) Field of Classification Search
USPC .............. 349/5, 9, 112; 359/485, 619; 353/20
See application file for complete search history.

(56) References Cited

U.S. PATENT DOCUMENTS

| | | |
|---|---|---|
| 6,437,900 B1 | 8/2002 | Cornelissen et al. |
| 2003/0043315 A1 | 3/2003 | Umemoto et al. |
| 2003/0072080 A1* | 4/2003 | Ariyoshi et al. ......... 359/487 |
| 2010/0188726 A1 | 7/2010 | Yoshimura et al. |
| 2010/0296025 A1 | 11/2010 | Gourlay |
| 2011/0217629 A1* | 9/2011 | Okuyama et al. ......... 430/4 |

FOREIGN PATENT DOCUMENTS

| | | |
|---|---|---|
| JP | 6-167689 A | 6/1994 |
| JP | 2002-542413 A | 12/2002 |
| JP | 2002-542513 A | 12/2002 |
| JP | 2003-66445 A | 3/2003 |
| JP | 2011-504641 A | 2/2011 |

OTHER PUBLICATIONS

"Dimming mirror device to achieve a significant reduction of the environmental impact of living", available at http://www.iblc.co.jp/nedo/category04/14.html, downloaded on Aug. 31, 2012.
"Video: look over there lucidity, EL organic notebook Samsung", available at http://japanese.engadget.com/2010/01/08/transparent/, published in 2010.

(Continued)

Primary Examiner — Amir Alavi
Assistant Examiner — Kenny Cese
(74) Attorney, Agent, or Firm — Knobbe, Martens, Olson & Bear LLP

(57) ABSTRACT

A display structure includes a liquid crystal module, and a light guide layer arranged on a surface of the liquid crystal module, first light-emitting devices arranged at an edge of one end portion of the light guide layer, and a transmittance-controllable layer arranged on a surface of the light guide layer opposing the liquid crystal module. The light-emitting devices are configured to emit light into the light guide layer, and thus the light emitted by the light-emitting devices is transmitted within the light guide layer. The transmittance-controllable layer may have light transmittance characteristics which change depending on an external stimulus applied thereto.

21 Claims, 9 Drawing Sheets